United States Patent [19]

Aizawa et al.

[11] 4,200,370
[45] Apr. 29, 1980

[54] CAMERA FOR DAYLIGHT AND FLASH PHOTOGRAPHY

[75] Inventors: Hiroshi Aizawa, Kawasaki; Masanori Uchidoi, Yokohama; Zenzo Nakamura, Urawa; Yoshiyuki Takishima, Yokohama, all of Japan

[73] Assignee: Canon Kabushiki Kaisha, Tokyo, Japan

[21] Appl. No.: 951,083

[22] Filed: Oct. 13, 1978

Related U.S. Application Data

[63] Continuation of Ser. No. 789,224, Apr. 20, 1977, abandoned.

[30] Foreign Application Priority Data

| Apr. 22, 1976 | [JP] | Japan | 51/45785 |
| Jun. 23, 1976 | [JP] | Japan | 51/74029 |
| Sep. 9, 1976 | [JP] | Japan | 51/108306 |
| Dec. 28, 1976 | [JP] | Japan | 51/159314 |

[51] Int. Cl.$^2$ ............................................. G03B 7/16
[52] U.S. Cl. .................................. 354/33; 354/23 D; 354/60 F; 354/139
[58] Field of Search ............... 354/33, 60 F, 139, 149, 354/23 D

[56] References Cited

U.S. PATENT DOCUMENTS

| 3,953,864 | 4/1976 | Iwata et al. | 354/139 |
| 4,016,575 | 4/1977 | Uchiyama et al. | 354/139 |
| 4,021,824 | 5/1977 | Uchiyama et al. | 354/139 |

Primary Examiner—Russell E. Adams, Jr.
Attorney, Agent, or Firm—Toren, McGeady and Stanger

[57] ABSTRACT

An automatic exposure control system for cameras of flash photographic capabilities which is switched to either of the daylight or the mode depending upon whether or not a storage capacitor across which a flash tube is connected is sufficiently charged. The system comprises first and second computers for deriving daylight and flash exposure aperture values respectively, a diaphragm control circuit selectively receptive of the outputs of the computers through a first switch, first and second timing circuits for providing daylight and flash exposure times respectively, and a shutter control circuit selectively receptive of the outputs of the timing circuits through a second switch. The system is characterized in the use of a single mode selection actuator which is common to the first and second switches and which causes an automatic selection of the flash mode when the camera release occurs after the attainment of the voltage of the storage capacitor to the normal firing level. Thus, it is made possible to prevent occurrence of an event where the flash tube is actuated for firing with the simultaneous occurrence of selection of the flash exposure time, while the daylight exposure aperture remains effective, as the storage capacitor voltage reaches the normal firing level at a point in time during the daylight exposure operation.

5 Claims, 8 Drawing Figures

CAMERA FOR DAYLIGHT AND FLASH PHOTOGRAPHY

This is a continuation of application Ser. No. 789,224, filed Apr. 20, 1977, now abandoned.

BACKGROUND OF THE INVENTION

1. Field of the Invention

This invention relates to cameras for daylight and flash photography, and more particularly to an automatic exposure control system for such cameras which is switched to either the daylight and flash mode depending upon whether or not a storage capacitor across which is connected a flash tube is sufficiently charged. Still more particularly, it relates to a novel operating mode selection device which enables the system to operate while insuring that the daylight and flash exposure control factors are not mixed with each other during each exposure operation despite the fact that the voltage on a storage capacitor has increased up to or fallen below a normal firing level during that exposure operation.

2. Description of the Prior Art

Some of the conventional automatic exposure control systems for daylight and flash photography have a problem that an unintentional actuation of the operating mode selection switch tends to occur at a point in time during an exposure operation in either the daylight or flash mode so that photographic information is changed with failure of the correct exposure. Particularly with the system for a camera of the type which is switched from the daylight to the flash mode in automatic response to the attainment of the voltage on a storage capacitor to a sufficient or normal firing voltage level for a flash tube, when this attainment occurs at a point in time during an exposure operation, there results the situation where one of the exposure aperture and time controls is made in the daylight mode, while the other is in the flash mode, thereby no correct exposure can be obtained. Further, there is some possiblity of accidental occurrence of firing of the flash tube during the daylight exposure operation which results in partial flash exposure, or so-called slit exposure, as the incident film frame is exposed to a complex of daylight and flash light at a portion of the entire area thereof, the other portion of which is exposed to only the daylight.

An object of the present invention is to provide an automatic exposure control system for a camera of flash photographic capability which has overcome the above mentioned conventional drawbacks and which operates in such a manner that when either the automatic daylight or flash mode is in operation, it is made impossible to effect automatic selection of the other mode until that one frame exposure or that continuous succession of frame exposures has been completed, thereby the reliability exposure control in either of the daylight or flash made is greatly improved.

Another object is to provide an automatic exposure control system which is switched from the daylight mode to the flash mode in automatic response to the attainment of the voltage on a storage capacitor reaching a normal firing level for a flash tube connected across the capacitor, characterized in that when the normal firing voltage appears both on a voltage detector and across the flash tube at a point in time during a daylight exposure operation, the switching from the daylight to the flash mode which may be followed by the firing of the flash tube can be prevented from occurring.

Still another object is to provide an automatic exposure control system which operates in such a manner that, as a continuous succession of frame exposures are made by use of a motor drive unit associated with the camera, when the attainment of the voltage on the storage capacitor to the normal firing level occurs at an intermediate point in time during the continuous succession of frame exposure operations, at least that one of the frames which is coincident with that intermediate time point is caused to be subjected to a daylight exposure operation and at least that one which is next thereto is caused to be subjected to a flash exposure operation.

These and other objects and features of the present invention will become apparent from the following detailed description taken in conjunction with the accompanying drawings in which:

DESCRIPTION OF THE PREFERRED EMBODIMENTS

Figure 1:
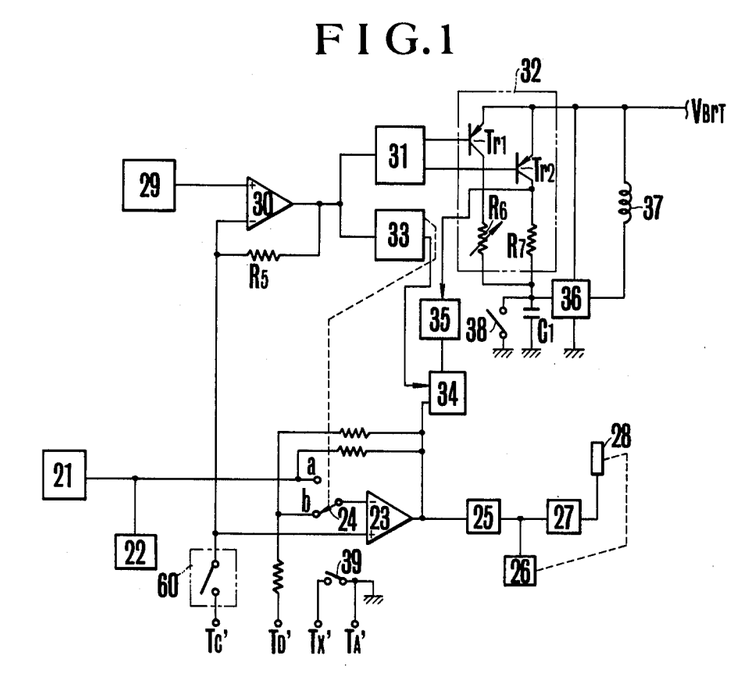
FIG. 1 and FIG. 2 together comprise a schematic circuit diagram, partly in block form, of one embodiment of an automatic exposure control system for daylight and flash photography according to the present invention, with FIG. 1 being that portion of the circuit which is incorporated in a camera, and with FIG. 2 being that portion which is incorporated in a flash unit.
Figure 2:
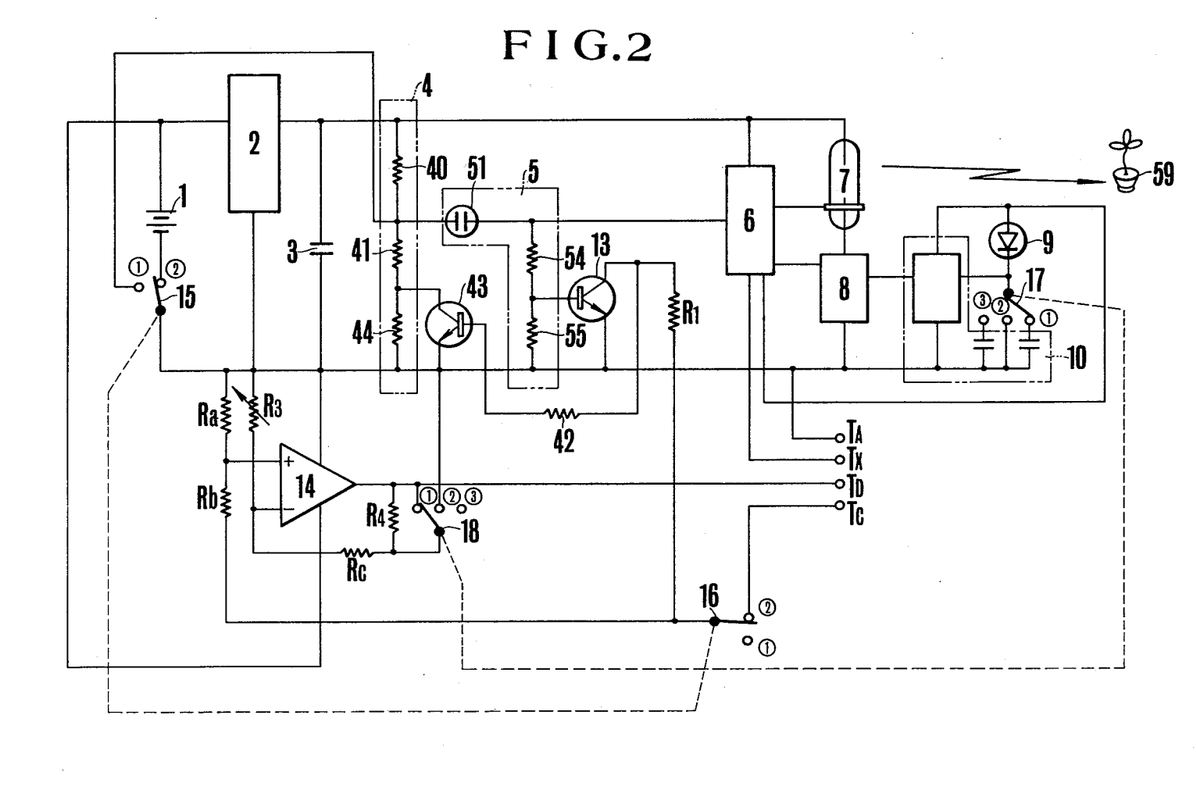

Referring to FIGS. 1 and 2 first to FIG. 1, there is shown one embodiment of an automatic exposure control system according to the invention comprising a sensor 21 including a photo-sensitive element capable of producing a voltage proportion to the illuminance of a scene being photographed, exposure control parameter setting means 22 for setting a film speed value, a shutter speed value and the like, an operational amplifier 23 constituting a common part of first and second computers for producing respective outputs representative of daylight and flash exposure values, in this instance, exposure aperture values respectively, and selectively receptive of daylight and flash photographic informations through a first mode selection mechanical-type switch 24 having two switchable positions "a" and "b" for the daylight and flash modes respectively, a memory means 25 which may be constructed in the form of a capacitor, a magnetic core, or an analog-to-digital converter for storing the output of the operational amplifier 23 in the analog or digital f diaphragm control means for controlling the size of diaphragm aperture of the camera in accordance with the output of the memory means 25 through an intermediary including a diaphragm-scanning potentiometer 26, a comparator 27 and a diaphragm arresting electromagnet 28, a first timing circuit of series-connected capacitor C1 and variable resistor R6, the latter being associated with a shutter dial not shown, a second timing circuit comprising the common capacitor of the first timing circuit and a fixed resistor R7 having a resistance value corresponding to a flash exposure time of 1/60 second, for example, a trigger circuit 36 which may take the form of a Schmitt type circuit selectively responsive to the outputs of the first and second timing circuits for controlling the period of actuation of a shutter electromagnet 37, and a second mode selection electronic switch 32 comprising first and second transistors Tr1 and Tr2 connected between respective timing resistors R6 and R7 and a common battery $V_{BAT}$. The camera is provided with four interconnection terminals $T'_A$, $T'_X$, $T'_D$ and $T'_C$ arranged to be brought into connection with respective interconnection terminals $T_A$, $T_X$, $T_D$ and $T_C$ of the flash unit when the flash unit is attached to the camera.

FIG. 2 shows the circuit of the flash unit comprising an electrical power source of battery 1, a storage capacitor 3 connected to battery 1 through a voltage booster 2, a gas discharge or flash tube 7 connected across storage capacitor 3 so that the voltage stored on storage capacitor 3 appears across flash tube 7, a gas discharge control circuit 8 connected between the cathode of flash tube 7 and the negative bus or negative pole of capacitor 3, a trigger circuit 6 for both of flash tube 7 and gas discharge control circuit 8, a photo-cell arranged to receive light reflected from an object 59 being photographed with flash illumination and connected through a manually operable flash aperture selecting switch element 17 to an integrating circuit 10 for integrating the output of photo-cell 9 through an integration control element of which the parameter is adjustable as depending upon the preselected flash exposure aperture value, the output of integrating circuit 10 being applied to circuit 8 to terminate the duration of firing of flash tube 7, and an operational amplifier 14 constituting part of the second computer of FIG. 1. A film speed setting variable resistor R3 is connected between the negative bus and the inversion input terminal of operational amplifier 14, and a resistor 4 having a resistance value dependent upon the flash exposure aperture value present in integrating circuit 10 is connected in the feedback network of operational amplifier 14. The non-inversion input terminal of operational amplifier 14 is connected to the output terminal of a voltage divider of series-connected resistors Ra and Rb which is connected between the negative bus and the interconnection terminal $T_C$ through a manually operable switch element 16 and which serves to constitute part of control means for controlling operation of an actuator of the invention to be described in detail later. Switch element 16 is assembled with another switch element 15 which is connected between the negative terminal of battery 1 and the negative bus to manually select either of the automatic daylight and flash exposure control modes. Switch element 17 is assembled with another switch element 18 connected in a lead between the feedback network of operational amplifier 14 and the negative bus. Series-connected three resistors 40, 41 and 44 comprise a voltage divider 4 connected across storage capacitor 3. A neon tube 51, and two resistors 54 and 55 are connected in series to each other and comprise a voltage detecting circuit connected across resistors 41 and 44 to detect whether or not storage capacitor 3 is charged to a normal firing voltage level for flash tube 7.

Referring again to FIG. 1, an automatically acted operating mode selection device of the present invention is shown comprising a reference voltage source 29, a variable voltage source R1, Ra, Rb, 13, 42, 43 (see FIG. 2) for providing either of high and low voltages depending upon whether the voltage on storage capacitor 3 is above or below the normal firing level as detected by the detecting circuit 5, an operational amplifier 30 having a non-inversion input terminal connected to reference voltage source 29 and having an inversion input terminal connected both to the variable voltage source through terminals $T'_C$-and-$T_C$ connection and to the non-inversion input terminal of operational amplifier 23, a first level detector 31 capable, upon detection of either of the high and low level outputs of operational amplifier 30, of rendering non-conductive either of first and second transistors Tr1 and Tr2 of the second mode selection switch 32 respectively, while maintaining the other conducted, a second level detector 33 capable, upon the common detection of the first level detector 31, of setting the first mode selection switch 24 to either of the positions "b" and "a" respectively, and first and second display lamps 34 and 35 arranged in the field of a viewfinder of the camera to be lighted on when the flash exposure aperture and time are selected respectively. In FIG. 2, the variable voltage source comprises a transistor 13 having a base electrode connected to a point on connection between resistors 54 and 55, having an emitter electrode connected to the negative bus, and having a collector electrode connected to switch element 16 through a resistor R1 which has a far smaller resistance value than that of the resistance voltage divider Ra and Rb and which is connected in parallel with the latter, and an additional transistor 43 having a base electrode connected through a resistor 42 to the collector electrode of transistor 13 and having emitter and collector electrodes connected across resistor 44 of voltage divider 4. The circuit consisting of resistor 42 and transistor 43 also serves as an inhibiting circuit when a camera release is actuated before the attainment of the voltage of storage capacitor 3 to the normal firing level.

In the operation of the system of FIGS. 1 and 2, assume that the flash unit is attached to the camera through connection of terminals $T_C$, $T_D$, $T_X$ and $T_A$ with terminals $T'_C$, $T'_D$, $T'_X$ and $T'_A$.

When an exposure is to be made in the daylight mode, the main switch 15 of flash unit is set to its "1" position with simultaneous setting of switch 16 to its "1" position where the variable voltage source is disconnected from the operational amplifier 30, causing the latter to produce a low level output voltage almost equal to that of the reference voltage source 29, so that the first and second level detectors 31 and 33 actuate the respective mode selection switches 32 and 24 to cause the automatic selection of the flash mode. As the first mode selection switch 24 brings the sensor 21 and exposure control parameter setting means 22 into connection with the operational amplifier 23, when camera release is actuated to initiate closing-down movement of the diaphragm means, the actual diaphragm aperture size is scanned by the potentiometer 26, and the scanning result is compared with the output of the memory means 25 by the comparator 27, upon occurrence of coincidence therebetween, to arrest the diaphragm means by the electromagnet 28. Thereafter, a not shown front shutter curtain begins to run down to the exposure aperture open position at which time a start switch 38 connected across the timing capacitor C1 is opened. As the first switching transistor Tr1 was previously rendered conducting by the first level detector 31 while the second switching transistor Tr1 being maintained in the non-conducting state, the timing capacitor C1 begins to be charged through the variable resistor R6 which was previously adjusted to a value dependent upon the preselected shutter speed. In a time interval equal to that shutter speed, the voltage on the timing capacitor C1 reaches a trigger level for the trigger circuit 36 to terminate the exposure, as the shutter electromagnet 37 is de-energized to release a not shown rear shutter curtain from the latched position.

When an exposure is to be made with automatic selection of the daylight and flash modes, the switch element assembly 17, 18 is set to their "2" positions where the photo-cell 9 is connected to the integrating circuit 10 and where the resistor R4 having a resistance value corresponding to the predetermined aperture value preset in the integrating circuit 10 is connected to the feedback network of the operational amplifier 14. Next, the main switch 15 is moved from its "1" position to its "2" position, thereby the voltage of battery 1 after increased by the booster 2 is applied to the storage capacitor 3.

Now assuming that a camera release is actuated before the attainment of the voltage stored on the storage capacitor to the normal firing level for the flash tube 7, as the transistor 13 remains in the non-conducting state, a voltage which continues to occur during each actuation of camera release is applied through terminals $T'_C$-and $T_C$ connection both to the base of the inhibiting transistor 43 through resistors R1 and 42 and to the resistance voltage divider Ra, Rb, causing the inhibiting transistor 43 to be rendered conducting so that it is impossible to establish a discharge in the neon tube 51 even when the voltage on the storage capacitor 3 reaches the normal firing level, and also causing the operational amplifier 30 to produce the low level output which unables the first and second level detectors 31 and 33 to actuate the first and second mode selection switches 24 and 32 for the automatic selection of the flash mode. As a result, the exposure is made in the daylight mode.

Alternatively assuming that a camera release is actuated after the neon tube 51 is lighted on to indicate that the voltage on the storage capacitor 3 as detected by the detecting circuit 5 has attained the normal firing level, as the transistor 13 is rendered conducting, the inhibiting transistor 43 is maintained non-conducted, and a relatively large current is allowed to flow from the inversion input terminal of the operational amplifier 30 through the resistor R1, because the resistance value of the resistor R1 is smaller than that of the voltage divider Ra, Rb. At this time, the output of the operational amplifier 30 exceeds the critical level for the level detectors 31 and 33, thereby the first mode selection switch 24 is moved from its "a" position to its "b" position where the output of the operational amplifier 14 is applied to the operational amplifier 23 through terminals $T'_D$-and-$T_D$ connection so that the size of diaphragm aperture of the camera is adjusted in accordance with the combined information of the film speed setting variable resistor R3 and the diaphragm value setting resistor R4. Further, the first switching transistor Tr1 is rendered non-conducting, while the second switching transistor Tr2 is rendered conducting, thereby the second timing circuit R7, C1 is selected for cooperation with the trigger circuit 36 with the resulting exposure time being 1/60 second. In synchronism with the running down movement of the front shutter curtain, a synchro-switch 39 is closed to actuate the trigger circuit 6 and a thyristor of the discharge control circuit 8, thereby the flash tube 7 is fired. Light from the object 59 under flash lighting condition is received by the photo-cell 9. When the output of the integrating circuit has reached a predetermined level, the aforesaid thyristor is turned off to terminate the duration of firing of the flash tube. It is to be noted here that the time interval during which the flash tube 7 is being fired depends upon the preselected diaphragm aperture value as well as upon the camera-to-object distance.

As the amount of electrical energy once stored on the storage capacitor 3 is sufficient to make a first few frame exposures in the flash mode, when a larger number of frame exposures than that of first frame exposures are to be made continuously in sequence with the help of a motor drive unit associated with the camera, it is possible that after the last one of the first few frame exposures has been completed, the voltage on the storage capacitor 3 falls below the normal firing level to cause extinguishment of the neon tube 51 which in turn causes conduction of the inhibiting transistor 43, thereby all of the remaining frame exposures in the single continuous sequence are made in the daylight mode despite of the fact that the storage capacitor 3 is sufficiently charged again at a point in time during the continuous succession of the remaining frame exposures.

If the operator is desired to make all the continuous succession of frame exposures in the flash mode, he has to stop the actuation of camera release just after the light of the neon tube 51 is extinguished. In order to facilitate this stopping operation, it is preferred to employ a resetting switch 60 as connected in a lead between the interconnection terminal $T'_C$ and the inversion input terminal of the operational amplifier 30 and as arranged to cooperate with a film advancing mechanism in such a manner that each time the film is advanced one frame, the switch 60 is opened. After a number of cycles of opening and closing operation of the switch 60, the voltage on the storage capacitor 3 may attain the normal firing level at which time a second series of flash exposures is initiated. It is to be noted that a number of exposures between the first and second series of flash exposures are made in the daylight mode.

Figure 3:
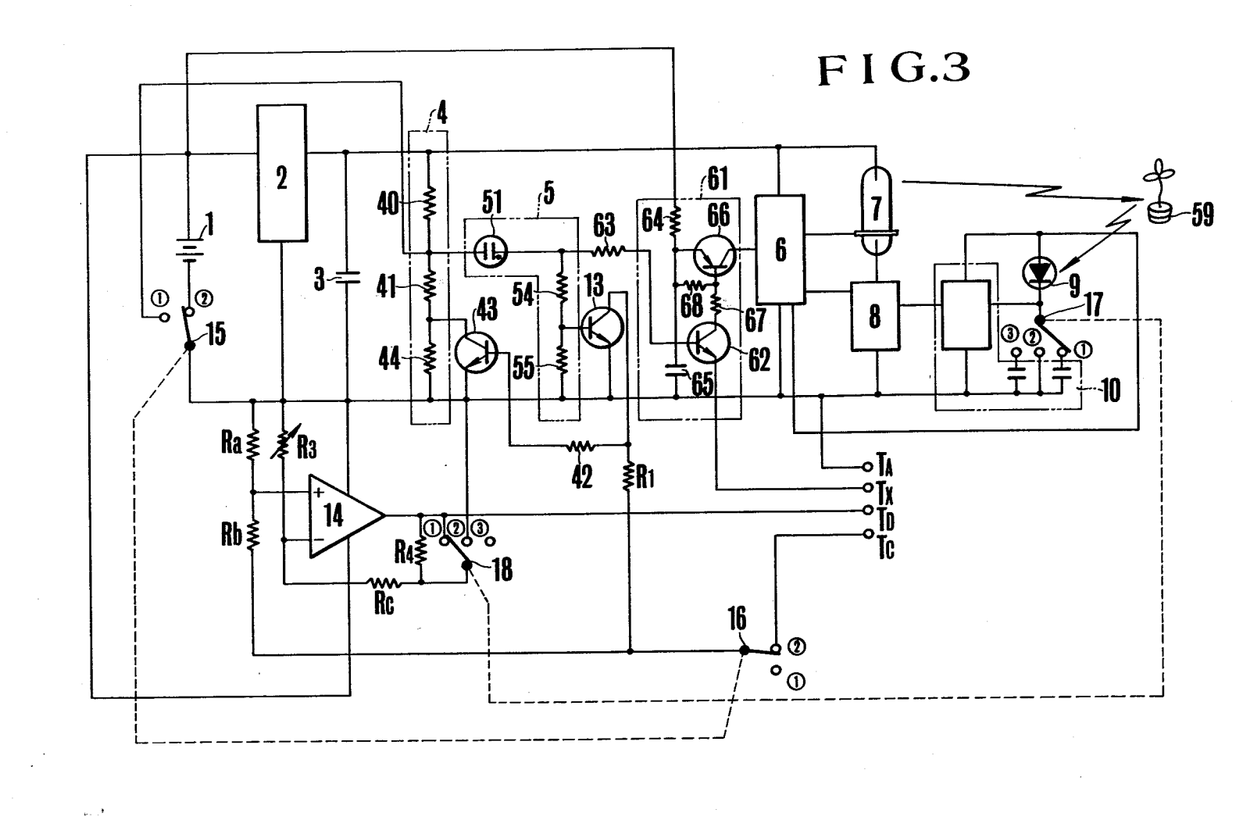
FIG. 3 shows an example of modification of the circuit of FIG. 2 by providing striking means for a flash tube as associated with a normal firing voltage detector.

FIG. 3 shows an example of the striking circuit for the trigger circuit 6 as associated with the voltage detecting circuit 5. The striking circuit 61 comprises a first transistor 62 having a base connected through a resistor 63 to a point on connection between the neon tube 51 and the resistor 54, and having an emitter connected to the interconnection terminal $T_X$, a second transistor 66 having a base connected through a resistor 67 to the collector of first transistor 62, having an emitter connected to a point on connection between a resistor 64 and a capacitor 65 which are connected across the positive and negative buses, and having a collector connected to the trigger circuit 6, and a resistor 68 connected between the emitter and base of the second transistor 66.

When the synchro-switch 39 of FIG. 1 is closed, the emitter of the first transistor 62 is connected to the negative bus. Now assuming that before this time the neon tube 51 was lighted on, the first transistor 62 is rendered conducting with simultaneous conducting of the second transistor 66 as a base current of the second transistor 66 flows from the capacitor 6 thereby the trigger circuit 6 is actuated.

Figure 4:
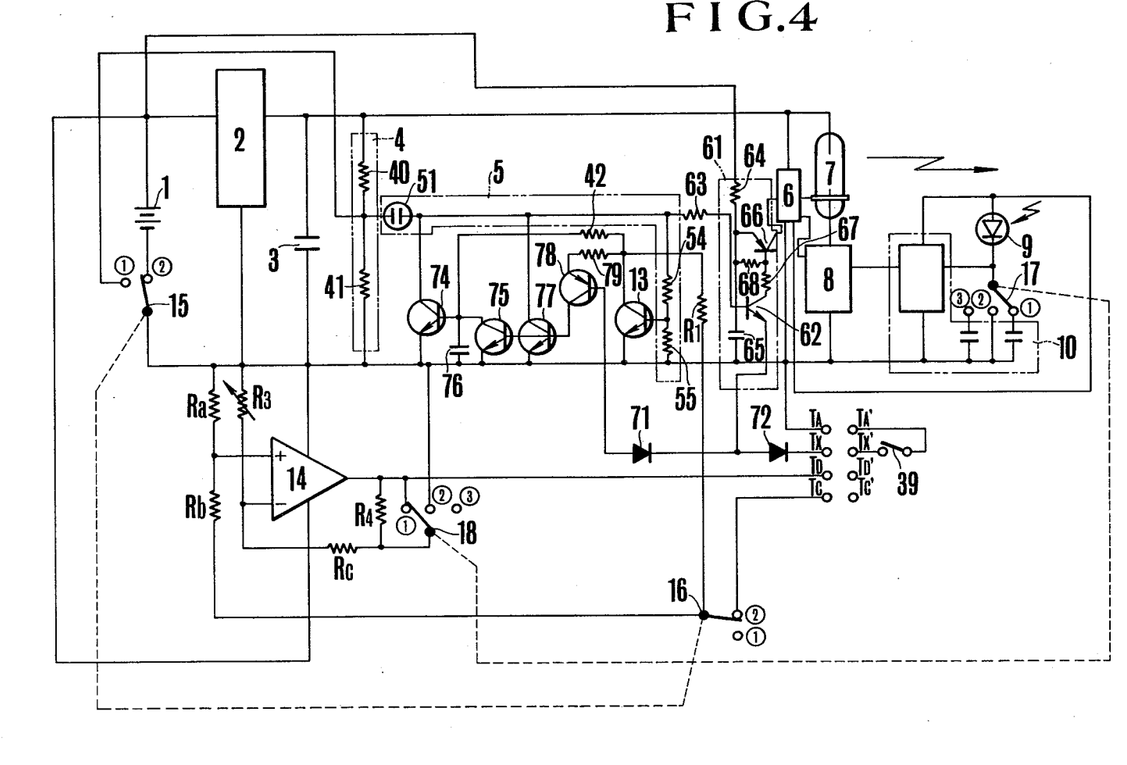
FIG. 4 shows another example of modification of the circuit of FIG. 2 by adding a resetting circuit for the normal firing voltage detector to the circuit of FIG. 3.

FIG. 4 shows an example of modification of the mode selection inhibiting circuit of FIGS. 2 and 3 by providing an automatic resetting circuit therefor. The modified inhibiting circuit comprises a first transistor 74 having a base connected through the resistor 42 to a point on connection between the collector of the mode selection actuating transistor 13 and the resistor R1, having an emitter connected to the negative bus and having a collector connected to the cathode of neon tube 51, and a second transistor 77 having an emitter connected to the negative bus and having a collector connected to the collector of the first transistor 74.

The resetting circuit comprises a first transistor 75 having an emitter connected to the negative bus and having a collector connected to the base of transistor 74, and a second transistor 79 having a collector connected to both of the base of transistors 75 and 77, having an emitter connected through a resistor 79 to the collector of transistor 13 and having a base connected through series-connected diodes 71 and 72 to the interconnection terminal $T_X$. The synchro-switch 39 of FIG. 1 is utilized as an actuator for the resetting circuit. A point on connection between diodes 71 and 72 is connected to the emitter of transistor 62 of the striking circuit 61.

When a continuous succession of exposures are to be made with automatic selection of the flash mode, the inhibiting and resetting circuits of FIG. 4 operate as follows. Now assuming that the voltage on the storage capacitor has not yet attained the normal firing level, when a camera release is actuated to apply an actuating signal to the base of the first inhibiting transistor 74, the output stage of the neon tube 51 is short-circuited so that the subsequent closure of synchro-switch 39 does not result in actuation of the striking circuit 61, while the mode selection actuating transistor 13 being maintained in the non-conducting state. At a time when this closure of synchro-switch 39 occurs to start in synchronism with the running down movement of the front shutter curtain, the first inhibiting transistor 74 is reset to the non-conducting position by the first resetting transistor 75, as the first and second resetting transistors 75 and 78 are rendered conducting. Conduction of the second resetting transistor 78 also causes conduction of the second inhibiting transistor 77, so that when it happens that the attainment of the voltage on the storage capacitor 3 to the normal firing level occurs at a point in time during the process of exposure of any one frame in the continuous succession of exposures, the flash tube 7 is not caused to fire and also the automatic mode selection switch actuators 30, 31 and are not caused to select the flash mode. When synchro-switch 39 is opened in synchronism with the initiation of running down movement of the rear shutter curtain, the second inhibiting transistor 77 is reset to the non-conducting position, thereupon the output stage of neon tube 51 is reset to the operative position where, as neon tube 51 has already lighted on, the mode selection actuating transistor 13 is set to the conducting state. As a result, the next frame is to be subjected to flash exposure. It is to be noted here that as the base of the first inhibiting transistor 74 is connected to a delay element or a capacitor 76, conducting of transistor 74 does not precede conducting of transistor 13.

Figure 5:
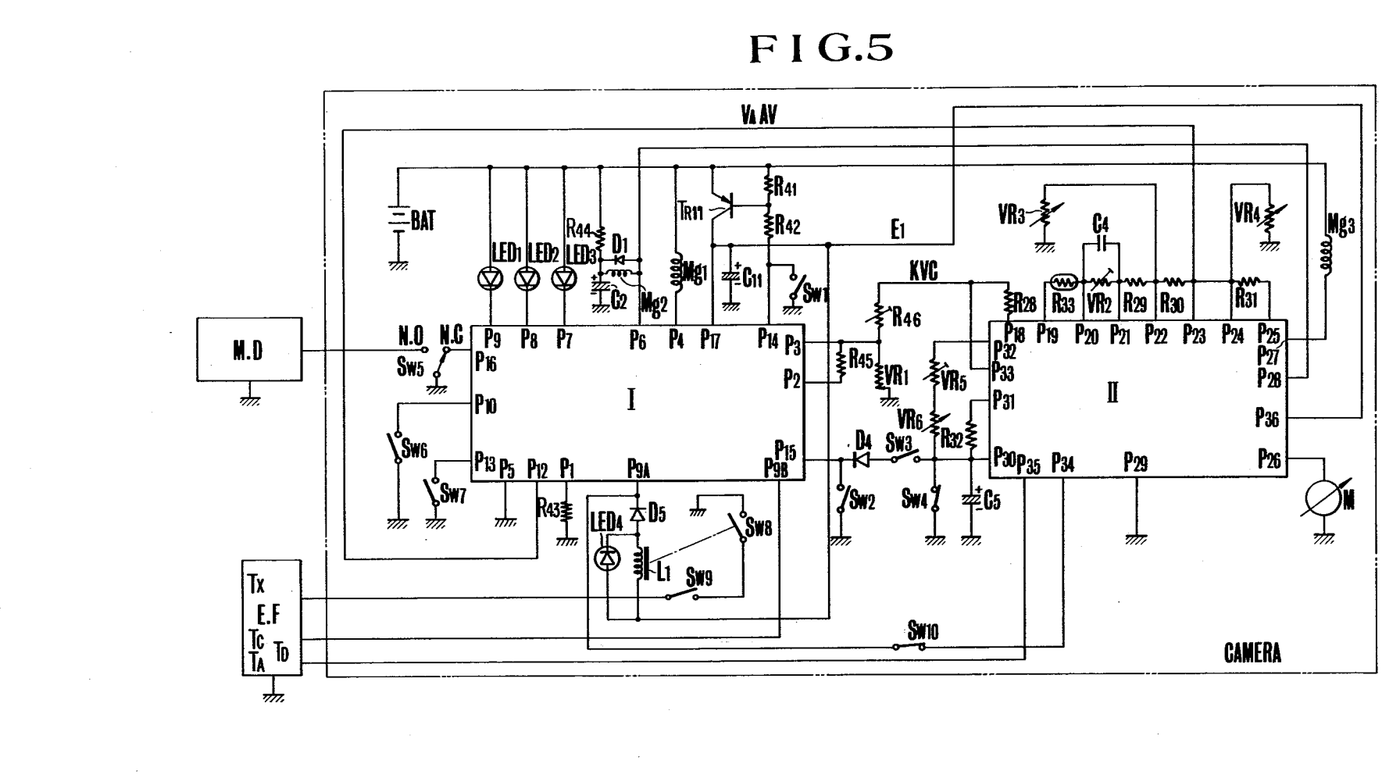
FIG. 5 is a schematic circuit diagram, partly in block form, of another embodiment of an automatic exposure control system according to the present invention.

Referring to FIGS. 5 to 8, another embodiment of the automatically acted operating mode selection device according to the invention is shown as applied to a digital type automatic exposure control system for daylight and flash photography. In FIG. 5, a dashed line block CAMERA indicates that portion of the system which is incorporated in a camera, a solid line block M.D. indicates a motor drive unit, and another solid line block E.F. indicates a flash unit which may be of the type shown in FIG. 2 with exclusion of the inhibiting circuit 42, 43.

Figure 6:
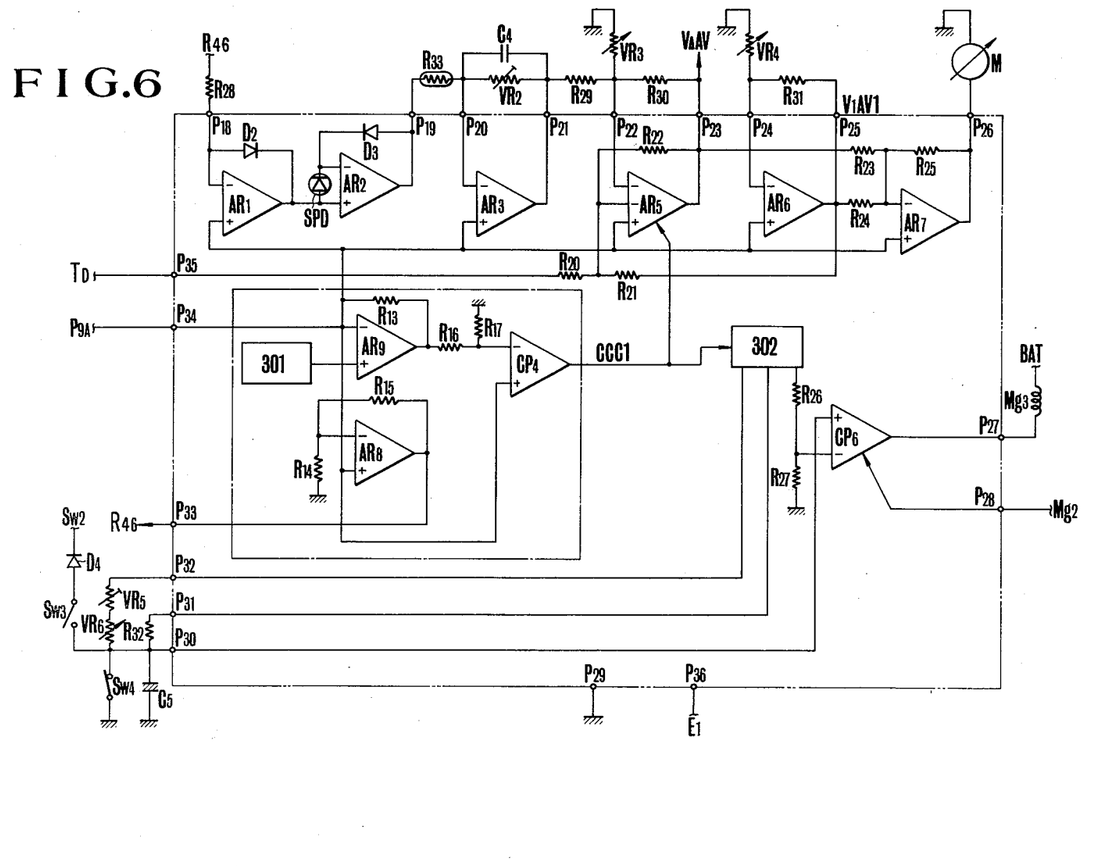
FIG. 6 shows the details of a block II of the circuit of FIG. 5.

Referring first to FIG. 6, there is shown an analogue type automatic exposure control circuit including a diaphragm value display circuit but with exclusion of a diaphragm control circuit which will be explained together with a coordinating control circuit for the various positions of the system in connection with FIG. 7. Those of the circuit elements which are enclosed in a dashed line block corresponding to block II of FIG. 5 may be disposed on a single semiconductor substrate in the form of a large scale integrated circuit equipment. An electrical power is supplied through a terminal P36 with no further lead being shown for the purpose of clarity.

Light from a scene to be photographed is incident upon a photo-sensitive element or silicon photo-diode SPD and causes a voltage to be generated, the level of which depends upon the brightness of the scene. The output voltage from SPD is supplied to an operational amplifier AR2 with a logarithmic compression diode D3 connected in the feedback network of AR2. In order to compensate for variation with temperature of the parameter of D3, there are provided a diode D2, an operational amplifier AR1 and a resistor R33. As a light source illuminating the scene flickers, the high frequency component of the output of AR2 is damped by a variable resistor VR2, a capacitor C4 and an operational amplifier AR3. The brightness information (Bv) from AR3 through a resistor R29 is combined with film speed and shutter speed informations preset in a common variable resistor VR3 by an operational amplifier AR5 to produce an output representing a difference $V_{\Delta AV}$ between a proper diaphragm value and a maximum aperture V1AV1 available in the camera objective lens and which is applied through a terminal P23 to the diaphragm control circuit (see FIG. 7) by way of a lead not shown and also to a low light level warning circuit by way of a lead shown in FIG. 5. The maximum possible diaphragm aperture is preset in a variable resistor VR4, so that upon combination of the outputs of AR5 and an operational amplifier AR6 with each other by an operational amplifier AR7, the proper diaphragm value is displayed by a meter M, for example, in the field of the camera viewfinder. Two variable resistors VR5 and VR6 for setting slow and fast shutter speed values respectively and a capacitor C5 comprise a first timing circuit for daylight photography. A second timing circuit for flash photography with a shutter speed of, for example, 1/60 second comprises a resistor R32 and the common capacitor of the first timing circuit. Selectively responsive to the outputs of the first and second timing circuits a comparator CP6 energizes and de-energizes the solenoid of a shutter electromagnet Mg3 from a battery BAT, provided that a camera release electromagnet Mg2 is previously operated.

Figure 7:
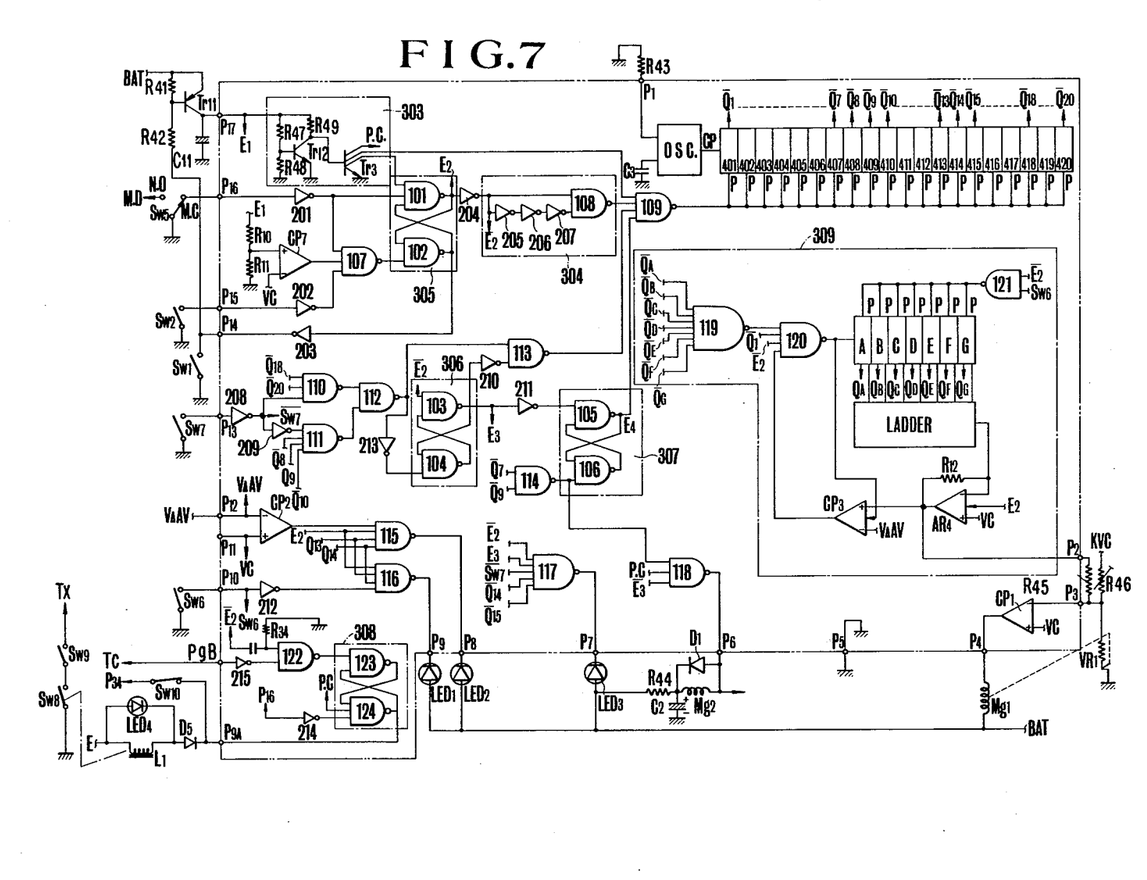
FIG. 7 shows the details of a block I of the circuit of FIG. 5.

The automatically acted operating mode selection device of the invention includes a reference voltage source 301, and an operational amplifier AR9 having a non-inversion input terminal connected to the reference voltage source 301 and having an inversion input terminal connected through a terminal P34 and a circuit portion of FIG. 7 to a variable voltage source which may be the same one as that, R1, 13, shown in FIG. 2. When the storage capacitor 3 is sufficiently charged, AR9 produces a high level output voltage which is then applied to a comparator CP4 to produce a low level output voltage. Responsive to this low level voltage, AR5 selects the input from terminal P35 connected to a flash exposure aperture information source which may be the same one as that including the operational amplifier 14 of FIG. 2, while an electronic type mode selection switch 302 which is shown in details in FIG. 8 selects the second timing circuit R32, C5 for connection with CP6.

Figure 8:
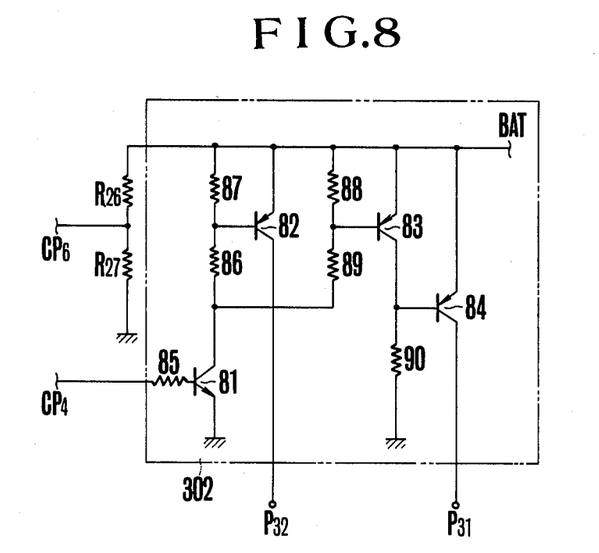
FIG. 8 shows the details of a block 302 of the circuit of FIG. 6.

In FIG. 8, the output of CP4 is connected to a base of a first transistor 81 through a resistor 85. Transistor 81 has an emitter grounded and has a collector connected both to a base of a second transistor 82 through a resistor 86 and to a base of a third transistor 83 through a resistor 89. Transistor 82 has a collector connected through a terminal P32 to the first timing circuit, and has an emitter connected to a positive bus, to which is also connected an emitter of transistor 83. Transistor 83 has a collector connected to a base of a fourth transistor 84 which has a collector connected through a terminal P31 to the second timing circuit. An emitter of transistor 84 is connected to the positive bus. Resistors 87 and 88 are connected across the bases and emitters of transistors 82 and 83 respectively. A resistor 90 is connected across the base of transistor 84 and ground. When the output of CP4 is of the high level, transistors 81, 82 and 83 are conducting, while transistor 84 is non-conducting, thereby a voltage is applied to P32. When it is of the low level, the case is reversed to apply a voltage to P31.

In FIG. 7, there are shown a power supply control circuit, a battery voltage checking circuit, manual-mode and automatic-mode selecting circuits, a mode display circuit, an out-of-diaphragm range display circuit, a self-timer circuit, a camera release actuating circuit, a diaphragm control circuit, and a flash mode inhibiting-and-resetting circuit, and a coordinating control circuit for these circuits, the all operation of which will next be explained. It is to be noted here that those of the circuit elements which are enclosed in a dashed line block may be disposed on a single semiconductor substrate in the form of a large scale integrated circuit.

(1) Assuming that the camera is in the cocked position where a switch SW5 is in its "N.C" position, when a shutter release button is depressed to a first stroke, a switch SW1 is closed causing a transistor Tr11 to be conducted with simultaneous application of a battery voltage E1 of binary level "1" to a power-up clear 303, thereby a binary counter having twenty stages 401 to 420 to preset, as a NAND 109 responsive to an instantaneous output of binary level "0" from block 303 produces an output of "1." This instantaneous output of "0" of 303 also causes a flip-flop FF305 to be preset to an initial state with production of a voltage E2 of "1," which in turn causes a flip-flop FF306 to be preset to an initial state with production of a voltage E3 of "1," which in turn causes a flip-flop FF307 to be present to an initial stage with production of a voltage E4 of "1."

As a switch SW6 is opened to select the automatic exposure control mode, upon advent of E2 on an analog-to-digital converter 309 constituting part of a diaphragm control circuit, a binary counter having seven output stages A to G is present by an output of a NAND 121, and an operational amplifier AR4 is grounded to prevent a diaphragm arresting electromagnet from being energized.

If the light value as sensed by SPD of FIG. 6 is below a certain level, that is, $V_{\Delta AV}$ is less than $V_C$, a comparator CP2 produces an output of "1" which is applied to a NAND 115 together with E2, $\overline{Q}13$ and $\overline{Q}14$ to produce an output of "0" at the points in time when $\overline{Q}13$ and $\overline{Q}14$ are simultaneously coincident at "1," as a clock pulse train CP at a frequency dependent upon the parameters of a resistor R3 and a capacitor C3 is supplied from an oscillator OSC to counter 401–420, thereby a light-emitting diode LED2 is intermittently energized, which can be viewed in the field of the finder, for example.

(2) Assuming that the voltage of battery BAT is equal to or higher than a satisfactory operating level as detected by a comparator CP7, when a further depression of the shutter release button from the first to the second stroke is made, a switch SW2 is closed, causing an inverter Iv202 to produce an output of "1" which in turn causes a NAND 107 to product an output of "0," thereby F.F.305 is inverted so that E2 is of "0," and an inverter Iv 203 produces an output of "0" to retain Tr11 in the conducting state even when SW1 is opened.

This inversion of FF305 also causes a one-shot circuit 304 to produce an output of "1" during a very short delay time interval depedent upon Iv's 205, 206 and 207, thereby counter 401–420 is reset again. After that, counter 401–420 starts to count the pulses from OSC. On the other hand, in coincidence therewith, the analog-to-digital converter starts to count pulses $\overline{Q}1$, and a diaphragm scanning mechanism starts to move with variation of the resistance of VR1, while diaphragm electromagnet Mg1 being energized. As the number of pulses counted by counter A–G increases, the output of AR4 is stepwisely decreased to coincidence with $V_{\Delta AV}$ at which a comparator CP3 is inverted to "1," thereby the counting operation of counter A–G is terminated. The use of the output of NAND 120 in controlling operation of CP3 is to eliminate the influence of noise on the counting operation. When the output of diaphragm scanning VR1 as detected by a comparator CP1 has come to coincidence with the output of AR4 the diaphragm arresting electromagnet Mg1 is actuated for deenergization to effect automatic adjustment of the aperture size in accordance with the computed exposure value.

As the automatic exposure control mode is selected with both of SW6 and SW7 being opened, an inverter Iv 208 which is connected through P13 to SW7 produces an output of "0" which is applied to an inverter Iv 209 with production of an output of "1." At a first point in time when $\overline{Q}8$ Q9 and $\overline{Q}10$ simultaneously become "1," a NAND 111, FF 306 is inverted so that E3 becomes "0." This results in energization of the camera release actuating electromagnet Mg2 which continues until Q17 and Q19 become "1" which are applied to a NAND 114. The "0" output of NAND 114 also causes inversion of FF 307 from "1" to "0" in E4 which results in the reset of counter 401–420.

(3) Assuming that the manual exposure control mode is selected with SW6 closed, an inverter Iv 212 produces an output of "1" which is applied to NAND 116 so that at the points in time when $\overline{Q13}$ and $\overline{Q14}$ simultaneously become "1," a light-emitting diode LED 1 is intermittently energized. In this case, the AD–DA converter 309 is maintained in the preset position throughout the process of exposure operation.

(4) Assuming that either of the automatic and manual modes operates with the self-timer with SW7 closed, when $\overline{Q18}$ and $\overline{Q20}$ simultaneously become "1" which are applied to NAND 110, the output E3 of FF 306 is inverted by NAND 112 from "1" to "0." At this time, counter 401–420 is reset to the initial state. This reset is immediately followed by initiation of counting operation of counter 401–420 which is then followed, after a short time interval until the occurrence of coincidence of $\overline{Q8}$, Q9 and $\overline{Q10}$ at "0," by the energization of camera release actuating Mg2.

After the exposure has been completed, switch SW5 is set from its N.C. position to its N.O. position, where Iv 201 produces "0" output so that FF 305 is inverted to produce E2 of "1." As SW1 is opened, therefore, Tr11 is rendered non-conducting. When E2 becomes "1," FF 306 is inverted to produce E3 of "1," by which FF 307 is also inverted to produce E4 of "1." Thus, all those portions of the circuit which have been described are reset.

Consideration will next be given to the operation of the automatically acted operating mode selecting device of the invention by reference to FIGS. 5 to 8. Assuming that the storage capacitor in E.F. of FIG. 5 has not yet been charged to a normal firing voltage for the flash tube, when the shutter release button is depressed to the first stroke, an output signal of binary "1" level is applied from the terminal Tc of E.F. to the block I of FIG. 5 or the dashed line block of FIG. 7 at a terminal P9B, a NAND 122 is gated off by the output of an inverter 215 connected to P9B. Upon further depression of the shutter release button to the second stroke, therefore, a flip-flop 308 can not be inverted to produce an output of "0," despite of the fact that a pulse of very short duration is applied to NAND 122 from a differentiating circuit including a resistor R34 and a capacitor so that no current is allowed to flow from a terminal P9A through the coil of a relay L1 controlling opening and closing operation of a switch SW8 connected in series with a synchro-switch SW9. Consequently, even when SW9 is closed, the flash tube is not caused to fire. Also, a light-emitting diode LED4 as a display means is not energized. As P34 of FIG. 6 is connected to P9A, CP4 produces an output of high level, causing automatic selection of the daylight mode.

Alternatively assuming that the voltage on the storage capacitor has attained the normal firing level at a point in time during the process of an exposure operation after the second stroke of shutter button, there is almost no possibility that this point in time occurs in coincidence with that at which the actuating pulse is applied to NAND 122, because the duration of this pulse is adjusted to a very short value.

After the attainment of the voltage on the storage capacitor to the normal firing level, the operator may depress the shutter release button to the full stroke, thereby NAND 122 is gated on to pass the actuating pulse therethrough to FF 308 which results in energization of relay L1 and diode LED 4, and also in automatic selection of the flash mode (see FIG. 6). At this time, switch SW8 is closed. It is to be noted that whilst the conventional system is usually designed to stop application of the control signal for the automatic selection of the flash mode in synchronism with the initiation of firing of the flash tube, the system of the invention is not influenced by such situation to prevent occurrence of changeover between the first and second timing circuits which will be encountered in the conventional one.

When the rear shutter curtain runs down to terminate the exposure, an output of "0" is applied from an inverter 214 connected through P16 with SW5 to NAND 124, thereby FF 308 is inverted to effect automatic selection of the daylight mode.

To permit manual selection of the automatic daylight mode with the effective use of the flash unit E.F. there is provided a switch SW10 which when opened permits application of the flash control signal from Tc to P9B without causing the selection of the flash mode.

What is claimed is:

1. A camera system on which a flash device can be mounted comprising:
   a flash device, said device including:
      (a) a flash discharge tube;
      (b) storage means for storing the flash energy for the flash discharge tube;
      (c) detecting means for detecting whether the flash energy stored in the storage means is higher than a certain determined level or not, said means producing a storage completion signal when the stored flash energy surpasses the determined level;
      (d) holding means for the photographing mode, said means including a first switching means to be closed when no storage completion signal is produced and a second switching means to be closed when the storage completion signal is produced, whereby the second switching means which has been closed holds the first switching means in the switched-off state while the first switching means which has been closed prevents the detecting means from producing the storage completion signal so as to hold the second switching means in the switched-off state; and
      (e) flash aperture information forming means for forming aperture information corresponding to a certain determined aperture value for flash photography;
   a camera body, said body including:
      (a) information input means, said means producing an electrical signal corresponding to the brightness of the object to be photographed;
      (b) calculating means;
      (c) change-over means capable of being changed over between a first position at which the output signal of the information input means is applied to the calculating means and a second position at which the output signal of the flash aperture information signal forming means is applied to the calculating means;
      (d) aperture control means for controlling the aperture in accordance with the output of the calculating means;
      (e) signal producing means for applying a signal to the photographic mode holding means in accordance with the release operation of the camera, said means applying the signal to the photographic mode holding means for producing a first signal when the first switching means is closed and a second signal when the second switching means is closed;

(f) first shutter time forming means capable of manually setting the shutter opening time;
(g) second shutter time forming means for setting the shutter opening time with a certain determined time for flash photography;
(h) shutter control means;
(i) switching means for applying either of the outputs of the first or the second shutter time forming means to the shutter control means; and
(j) operation control means for controlling the operation of the switching means and the change-over means, said operation control means responsive to the first signal from the signal producing means for changing over the switching means so as to apply the output of the first shutter time control means to the shutter control means and, at the same time, changing over the change-over means to the first position, while said operation control means, responsive to the second signal from the signal producing means, changing over the switching means so as to apply the output of the second shutter time control means to the shutter control means and, at the same time, changing over the change-over means to the second position.

2. A system in accordance with claim 1, wherein the flash device further includes:
trigger means for triggering the flash discharge tube; and
means for actuating the trigger means, said means presenting a third switching means, said switching means being closed with the storage completion signal from the detecting means so as to bring the operation means into the operable state.

3. A camera system in accordance with claim 1, wherein the camera body further includes means for displaying the flash photographic mode with the application of the second signal from the signal producing means to the operation means.

4. A camera system in accordance with claim 1 wherein the flash device further includes reset means for opening the first switching means in operative engagement with the termination of the exposure operation.

5. A camera system on which the flash device can be mounted comprising:
a flash device, said device including:
(a) a flash discharge tube;
(b) storage means for storing the flash energy for the flash discharge tube;
(c) detecting means for detecting whether the flash energy stored in the storage means is higher than a certain determined level or not, said means producing a storage completion signal when the stored flash energy surpasses the determined level;
(d) holding means for the photographic mode, said means including a first switching means to be closed when no storage completion signal is produced and a second switching means to be closed when the storage completion signal is produced, whereby the second switching means which has been in a switched-off state while the first swiching means which has been closed prevents the detecting means from producing storage the completion signal so as to hold the second switching means in the switched-off state; and
(e) a flash aperture information corresponding to a certain determined aperture value for the flash photography;
a camera body, said body including:
(a) information input means, said means producing an electrical signal corresponding to the brightness of the object to be photographed;
(b) calculating means to which the output signal of the information input means or the output signal of the flash aperture information signal forming means is applied;
(c) aperture control means for controlling the aperture in accordance with the output of the calculating means;
(d) signal producing means to be electrically coupled to the photographic mode holding means in accordance with the release operation of the camera, said means producing a first signal when the first switching means is closed and a second signal when the second switching means is closed;
(e) first shutter time forming means capable of manually setting the shutter opening time;
(f) second shutter time forming means for setting the shutter opening time with a certain determined time for the flash photography;
(g) shutter control means;
(h) switching means for applying either of the output of the first or the second shutter time forming means to the shutter control means; and
(i) control means for controlling the input signal of the calculating means and the operation of the change-over means, said control means, responsive to the first signal from the signal producing means, controlling so as to apply the output signal of the information input signal to the calculating means and, at the same time, changing over the changeover means into the first position, while said control means, responsive to the second signal from the signal producing means, controlling so as to apply the output signal of the flash aperture information forming means to the calculating means, at the same time changing over the change-over means into the second position.

* * * * *